Dec. 15, 1953
O. D. SHARP
2,662,754
PROTECTOR FOR MILK SHAKE MIXERS
Filed Jan. 25, 1951
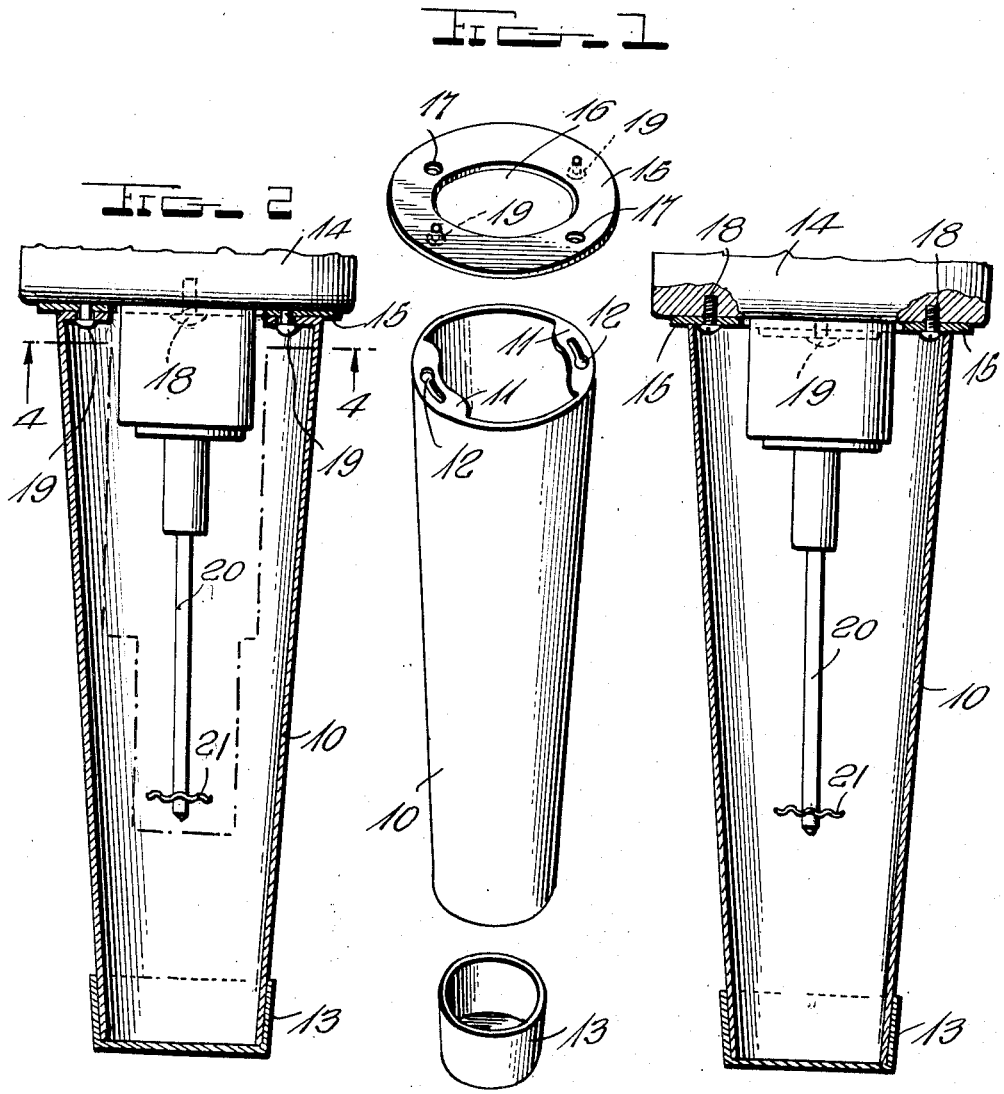
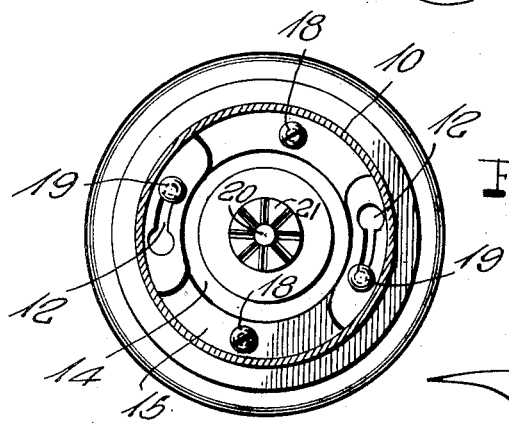
INVENTOR.
OLEN D. SHARP,
BY
Felix A. Russell
ATTORNEY Patented Dec. 15, 1953

2,662,754

UNITED STATES PATENT OFFICE 2,662,754

PROTECTOR FOR MILK SHAKE MIXERS

Olen D. Sharp, Evansville, Ind.

Application January 25, 1951, Serial No. 207,795

1 Claim. (Cl. 259—125)

The present invention relates to a protector for milk shake mixers and it consists in the combinations, constructions and arrangements of parts herein described and claimed.

Generally the invention comprises a protector for the agitator, agitator shaft and the underside of a motor casing associated with such agitator in conventional drink mixing machines and it comprises a funnel-shaped tube which is open at both of its ends, the upper end being provided with a pair of diametrically opposed inwardly extending flanges each of which is provided with a bayonet slot. The motor housing referred to is provided with a pair of diametrically opposed headed pins which are receivable in the bayonet slots whereby the funnel-shaped protector may be engaged and disengaged quickly and easily from the pins. A cap is provided for the lower end of the protector which lower end is the smaller end preferably of the device, so that the same may be easily cleaned whenever necessary. The device forms a protector against dust and dirt as well as insects to prevent the same from contacting the agitator while the same is not in use. As aforesaid, the device may be very quickly removed from the drink mixing machine when it is desired to utilize the same actively and may likewise be quickly replaced when the machine is not in use.

It is accordingly an object of the invention to provide a device of the character set forth which is simple in construction, easy to manufacture, inexpensive and yet efficient and effective in use.

Another object of the invention is to provide a novel protector for the agitator of a conventional drink mixing machine.

A further object of the invention is the provision of novel means for attaching and detaching a device of the character set forth from a conventional drink mixing machine.

A further object of the invention is the provision of a novel cap construction forming a part of the invention.

Other and further objects of the invention will become apparent from a reading of the following specification taken in conjunction with the drawing, in which:

Figure 1 is an exploded perspective view of an embodiment of the invention,

Figure 2 is a vertical sectional view, partly in elevation, of the device forming the present invention shown mounted upon a drink mixing machine, Figure 3 is a view similar to Figure 2 but taken perpendicularly thereto, and Figure 4 is a sectional view taken along line 4—4 of Figure 2.

Referring more particularly to the drawing, there is shown therein an elongated funnel-shaped tube 10 whose smaller end projects downwardly and whose upper end is provided with a pair of diametrically opposed inwardly extending flanges 11 each provided with a bayonet slot 12.

A cap 13 of generally frusto-conical shape is provided for closing the lower or smaller end of the tube 10 and fits the same snugly so that it may be held in position upon the tube 10 by friction.

To the underside of a conventional fixed motor 14 there is attached a circular plate 15 having a centrally disposed opening 16 therein. The plate 15 is provided with a pair of diametrically opposed holes 17 for the reception therethrough of screws 18 or the like whereby the plate may be attached to the underside of the motor 15. A pair of diametrically opposed dependently carried headed pins 19 are mounted upon the underside of the plate 15 in positions ninety degrees away from the holes 17 in each case.

Centrally dependent from the motor 14 is a conventional agitator 20 provided with an agitating blade 21 adjacent the lower end thereof.

In operation, it will be apparent that the plate 15 is first permanently affixed to the underside of the motor casing 14 by means of the screws 18 and that thereafter the tube 10 may be quickly and easily attached to the plate 15 by means of the pins 19 which are receivable in the bayonet slots 12. It will also be seen that the device will normally remain in such attached position with the cover 13 securely fastened by frictional engagement with the lower end of the tube and that in such condition the agitator 20 and its blade 21 will be protected from germs, insects and dust to thereby maintain the same in a substantially clean condition.

When, however, it is desired to utilize the mixing machine in conventional manner, it is only necessary to twist the tube 10 to remove the same from engagement with the pins 19 after which the mixing machine may be used in conventional manner. When it is desired to clean the device forming the present invention, it is only necessary to remove the cap 13 from the tube 10 after which hot water may be poured through the tube 10 and the cap 13 individually cleaned. It will be seen that the provision of the cap 13 will allow access to the lower or narrower portion of the tube 10 when the cap 13 is removed therefrom.

While but one form of the invention has been shown and described herein, it will be readily apparent to those skilled in the art that many minor modifications may be made without departing from the spirit of the invention or the scope of the appended claim.

What is claimed is:

A device of the character described comprising, in combination with a mixing machine having a motor housing and a centrally dependent agitator, the provision of a plate having a central opening and surrounding said agitator, said plate having a pair of diametrically opposed holes, screws extending through said holes and threadably engaged with the underside of said motor housing, a pair of diametrically opposed headed pins dependent from said plate, said pins each being circumferentially spaced ninety degrees from its adjacent hole, a downwardly and inwardly tapering open-ended tube encompassing said agitator, a pair of inwardly extending diametrically opposed flanges formed at the upper end of said tube and each having a bayonet slot formed therein for the reception of said headed pins, and a cap removably and frictionally mounted upon the lower end of said tube.

OLEN D. SHARP.

References Cited in the file of this patent

UNITED STATES PATENTS

| Number | Name | Date |
| --- | --- | --- |
| 1,158,591 | Ubelaker et al. | Nov. 2, 1915 |
| 1,435,289 | Gilbert | Nov. 14, 1922 |
| 1,436,172 | Holmgren et al. | Nov. 21, 1922 |
| 1,592,788 | Supervielle | July 13, 1926 |